United States Patent [19]  
Takahasi et al.

[11] 3,871,938  
[45] Mar. 18, 1975

[54] PROCESS OF MAKING LEATHER LIKE SHEET MATERIAL

[75] Inventors: Takemitsu Takahasi, Tokyo; Keigi Yamazaki, Omiya; Hirosi Tanaka, Urawa, all of Japan

[73] Assignee: Fuji Spinning Co., Ltd., Tokyo, Japan

[22] Filed: July 6, 1972

[21] Appl. No.: 269,381

[30] Foreign Application Priority Data  
Nov. 27, 1971 Japan.............................. 46-94890

[52] U.S. Cl................... 156/246, 156/247, 156/306, 161/DIG. 2, 117/63, 117/72 F
[51] Int. Cl.............................................. B32b 27/40
[58] Field of Search .......... 156/246, 247, 306, 308; 117/63, 72 F; 161/DIG. 2

[56]  References Cited  
UNITED STATES PATENTS

| | | | |
|---|---|---|---|
| 3,486,967 | 12/1969 | Fisher................................. | 156/306 |
| 3,551,244 | 12/1970 | Forester et al...................... | 156/246 |
| 3,590,112 | 6/1971 | Civardi........................... | 161/DIG. 2 |
| 3,650,880 | 3/1972 | Tieniber............................ | 156/246 |
| 3,669,792 | 6/1972 | Mitsukawa et al.................. | 156/246 |
| 3,671,345 | 6/1972 | Barnes et al........................ | 156/246 |
| 3,764,363 | 10/1973 | Civardi et al. ................ | 161/DIG. 2 |

Primary Examiner—William J. Van Balen  
Assistant Examiner—William R. Dixon, Jr.  
Attorney, Agent, or Firm—Oblon, Fisher, Spivak, McClelland & Maier

[57]  ABSTRACT

A leather-like sheet material is manufactured by coating a polymer solution, which contains a major proportion of a polyurethane elastomer, onto a supporting base, coagulating the polymer by dipping the coated base into a non-solvent so as to form a first layer which retains a portion of said non-solvent, coating a second polymer solution which contains a major proportion of a polyurethane elastomer, which solution may be the same or different from the first solution, onto said first coagulated layer, applying a fibrous substrate to the second polymer solution layer, dipping said coated substrate into a non-solvent to coagulate the second layer, and peeling a product of said coagulated layers and fibrous substrate from said supporting base.

10 Claims, No Drawings

PROCESS OF MAKING LEATHER LIKE SHEET MATERIAL

BACKGROUND OF THE INVENTION

1. Field Of The Invention

This invention relates to a method of manufacturing a flexible leather-like sheet material by forming on a base, such as a woven or non-woven fabric, a soft layer of a fine porous structure obtained by the wet coagulation of a polymer solution containing a major proportion of a polyurethane elastomer.

2. Description Of The Prior Art

Generally, wet coagulation techniques have been used in the formation of leather-like sheet materials. Most of the prior art techniques used heretofore have centered upon the formation of a porous layer from a polymer solution, usually a polyurethane containing solution, onto a fibrous substrate. While these prior art techniques were capable of providing a fairly acceptable quality of leather-like sheet material, in terms of good flexibility, good water-vapor permeability and good drape properties, they have not been capable of producing leather-like sheet materials having smooth surfaces. Recent investigations directed to solving this problem have generally been concerned with the manner in which the non-woven fabric substrates relate to, or are affected by, the formation of the microporous polyurethane elastomer layers; the selection of the chemical structure, the composition of the urethane resins, the conditions of wet coagulation and/or the conditions of after treatment of the product.

Much work has been done with particular regard to improving the process conditions for coagulating the polyurethane elastomer solution with a non-solvent, as evidenced by U.S. Pat. No. 3,000,757, French Patent 1,225,729, U.S. Pat. Nos. 3,100,721, 3,190,766, 3,238,055, and Japanese Patent Publications Sho 45-18791, Sho 45-18794, Sho 44-26749 and Sho 45-20790.

All of these disclosures, however, have concentrated on the problems of forming microporous layers. In order to obtain a leather-like sheet material of commercial value, however, it is necessary to solve other problems associated with the particular choice of woven or non-woven fabric substrates and to also solve those problems associated with the particular choice of polyurethane used. Until these problems are solved, an effective commercial product cannot be obtained.

One of the chief problems in solving these difficulties is that it has not been possible to obtain leather-like products having sufficiently comparable appearance to leather, even though good microporous materials have been formed. The prior art processes invariably resulted in such appearance problems as uneven, orange-like skin, rough, cardboard-like creases being formed upon bending of the material, or an emphasized, orange-like, uneven surface resulting from applied stresses, etc. These defects cannot be alleviated by subsequent embossing or coating of the material.

One of the difficult problems associated with the conventional method of coagulating a polymer solution onto a fibrous substrate is that the substrate often suffers extensive deformation due to the contact of the substrate with the polymer solution and by the subsequent contact with the non-solvent coagulating solution. Deformation seems to occur as follows: the degree of swelling of the wet fibrous substrate will vary depending upon the type and size of fiber, degree of entwinement and degree of heat shrinkage. It is therefore difficult to determine suitable conditions for obtaining a specific quality. When a non-woven fabric is used as the fibrous substrate, the degree of swelling in the polymer solution will vary depending upon the type of binder in the non-woven fabric, i.e., whether it is NBR, SBR or polyurethane. This results in an additional difficulty in trying to accurately control production. Furthermore, the behavior of the polymer during coagulation and the degree of volume contraction of the polymer itself will be dependent upon the particular polyurethane used and its molecular weight. Accordingly, accurate control of these factors is very difficult.

In addition to these difficulties, additional problems arise because of the intrinsic nature of the material itself. Non-woven fabrics have an uneven density which causes uneven impregnation of the polymer solution. Moreover, there is a tendency for the polymer to contract as it is coagulated. This volume contraction occurs on the surface in all three dimensions of width, length and depth, irregardless of the fineness and uniformity of the porous structure formed in the coagulated layer. In continuous, industrial production processes, this contraction occurs largely in the width direction. Because of these additional influential factors, it is quite difficult to obtain a leather-like sheet material which has a smooth, microporous surface of polyurethane.

One alternative method which has been suggested is to apply a solution of the polymer onto a plastic film, glass sheet or steel sheet, as a supporting base, coagulate the polymer by wet-coagulation techniques, peel the coagulated layer from the base, and drying it to obtain a porous sheet. The sheet is then applied to a fibrous substrate. The coagulated layer formed in this manner is therefore not affected by changes in the fibrous substrate.

This process, however, has a number of distinct disadvantages. When the microporous film is peeled from the supporting base and washed with water and dried, the film tends to contract and becomes irregularly strained during drying. The strain of contraction is increased when the specific space volume of the microporous structure is increased. Because a film is usually colored with a pigment, the strain of contraction caused by drying will vary depending upon the kind of the pigment used, whether organic or inorganic. The strain of contraction also varies to a large extent depending upon the composition of the polymer and its molecular weight.

This phenomenon occurs as a result of blocking which occurs upon the evaporation of water which fills many fine cavities or holes in the microporous structure of the film. Blocking occurs locally between the inner surfaces of these cavities or holes at a certain stage in the drying process. If a large amount of low molecular weight compound is contained in the polyurethane, or if the product is intended to have a high specific space volume, such as suede, this defect is particularly prominent. While it can be largely avoided by drying the coagulated layer, without prior peeling from the supporting base, in general, it is much too difficult to peel off the coagulated layer from the base. Another difficulty in that process is that usually the porous film is bonded to the non-woven fabric with an adhesive material. Any unevenness in the density of the fibers or unevenness in the density of the binder in the non-woven fabric will appear clearly through the film on the surface, even though the non-woven fabric will otherwise appear smooth. When such a sheet material is shaped under tension in a mold, such as in the preparation of shoes, the unevenness of the substrate will be particularly apparent. This disadvantage will occur regardless of the structure of the film bonded to the substrate, whether it is of a uniform, fine porous structure, or whether it is a somewhat rougher, more uniform structure. In order to prevent this disadvantage, it is necessary to improve the structure of the non-woven fabric and its finishing. When the film is laminated to a non-woven fabric, it is necessary to carefully select the structure of the non-woven fabric to be used as a substrate, and to cover the surface with a sufficient volume of a suitable coating to give a finish of mirror-like smoothness.

SUMMARY OF THE INVENTION

The object of this invention does not necessarily lie in the solution of some or all of the problems mentioned above in the manufacturing of leather-like material, but rather in the creation of a novel method of manufacturing leather-like sheet material. The process of the present invention utilizes wet coagulation but can use a wide variety of substrates, such as woven fabrics, non-woven fabrics, or a reclaimed leather. The polymer composition used herein is composed predominantly of a polyurethane elastomer, such as polyurethanes formed from polyesters or polyethers, or polyurethanes containing a plurality of urea bonds.

According to the present invention, leather-like sheet material is prepared by coating a first polymer solution, containing a predominant amount of a polyurethane elastomer, onto a supporting base and coagulating said polymer onto said base by dipping the coated substrate into a non-solvent, coating a second polymer solution, which also contains a predominant amount of a polyurethane elastomer, and which may be the same or different from the first solution, and dipping the substrate containing the second coating into a non-solvent so as to coagulate a second layer onto the first coagulated layer, peeling off the product from the supporting base and then washing and drying the product.

DESCRIPTION OF THE PREFERRED EMBODIMENTS

A solution of polymer, containing a predominant amount of a polyurethane elastomer is coated on a supporting base. The base should have a smooth supporting surface that will not deform appreciably under the forces of surface contraction when the polymer is coagulated in the wet process. After coagulation, the first layer will have a microporous structure filled with a non-solvent, such as water. Next, a second solution containing a polyurethane elastomer is applied onto the surface of the first coagulated layer after water content is regulated. A fibrous substrate such as a woven fabric or a non-woven fabric is placed onto the second solution layer using a slight degree of pressure, if necessary, and it is immersed into a non-solvent, such as water, to coagulate the second polymer layer. The non-solvent is supplied from the first coagulated layer and also the side opposite the fibrous substrate.

The sheet material containing the first coagulated layer, the second coagulated layer and the fibrous substrate is then peeled from the supporting base and washed with water to remove the solvent. It is then dried. A smooth, leather-like sheet material containing no surface distortion is found which is characterized by a similar feel to continuous sheet natural calf leather and which shows no substrate unevenness.

The characteristic features of this invention are that it does not require strict control of process conditions, during wet coagulation, washing or drying, nor is it hampered by the limited selection of specially finished fibrous substrates as was required in conventional wet process techniques.

The dimensions of the polyurethane elastomer layer are maintained stable by the use of the supporting base until the first and second polyurethane layers are coagulated. When the polyurethane layers are dried after they are peeled from the base, they are supported by the fibrous substrate which continues to maintain their dimensions.

Accordingly, the polyurethane layers can be coagulated and dried without substantial difficulties and without severely limiting the process conditions. In addition, the surface of the first coagulated layer formed on the surface of the supporting base can be maintained in an intact condition until drying is complete, contrary to the case of self-supporting elastic films.

The second coagulated layer will completely bond to the first coagulated layer without damaging the microporous structure of the first layer. It will also permeate into the fibrous substrate so as to adjust any unevenness in density and will coagulate in a relatively short period of time by the action of a non-solvent since it is supplied from both sides. Accordingly, even if the fibrous substrate is naturally swelled, the fibrous substrate will bond to the first coagulated layer, whose integrity will be maintained by the base, before formation of crepe by the distortion of swelling. It is possible to obtain a smooth sheet of material having the appearance of a continuous sheet of natural calf leather without having a fibrous appearance caused by the fibrous substrate.

The main advantage of this invention is that it does not require severe coagulation and drying conditions, and it allows a wide selection of fibrous substrates without sacrifice of dimensional stability and smoothness. This advantage has a number of important ramifications. For instance: a variety of pigments and other fillers may be incorporated into the material; the same resin or different resin formulations may be incorporated into the polymer solution; the concentration of the polymer in solution may be varied; the viscosity of the polymeric solution may be varied; different types of fibers and binders may be used in the fibrous substrates. All of these factors may be varied, depending upon the type of final product desired. Even though a wide range is allowed in the selection of materials and formulations, it is possible to obtain a smooth surface sheet material which is vapor-permeable and microporous.

Of course, in the processes of this invention, selection of raw materials can be limited and the formula of the coagulation bath and coagulation conditions can be controlled, so that the cell structure formed in the product will conform to any type of product desired.

The process of this invention has many other advantages in comparison to the conventional processes. One of these advantages is that the initial coagulation period is short. In the process of this invention, the first coagulated layer is exposed to the coagulation bath on its surface opposite the supporting base. Thus, the degree of coagulation of the polymer is affected only by the rate at which the solvent is replaced with a non-solvent within the coagulated layer. Since the porosity of the coagulated layer is affected by the rate of exchange of solvent with non-solvent, the degree of porosity can be controlled.

The coagulation time for the second coagulated layer is short and a uniform porous layer is easily formed. The reason is believed to be that coagulation occurs on both sides of the second layer. Thus, replacement of the solvent with non-solvent occurs when the non-solvent diffuses through the fibrous substrate by capillary action into the second coagulated layer, while coagulation of the second layer, adjacent the first coagulated layer, will occur by the exchange of polymer solvent with the non-solvent retained in the cavities of the microporous layer.

The first coagulated layer will contain at least 0.5 times, and usually 2 to several times, the quantity of a non-solvent, based on the dry weight of the polymer layer, even after pressure is applied to the first coagulated layer. Accordingly, even if the second layer is coated to a thickness of 2 to several times that of the first layer, a sufficient quantity of non-solvent will be retained in the first layer to coagulate the second layer. Due to this, the microporous structure of the first coagulated layer will not be damaged by the solvent of the second layer. Thus, sufficient diffusion and dilution of the solvent by the non-solvent will be attained so as to provide a second coagulated layer having a microporous structure. Since coagulation of the polyurethane elastomer is accomplished in a relatively short period of time, it is possible to continuously prepare the sheet material by using an endless belt as the supporting base, in accordance with the process of this invention.

In a similar process to this invention, but one which does not have a second coagulated layer, a solution of polyurethane elastomer is applied onto a supporting base to form a layer of polymer solution and a fibrous substrate is superimposed onto the layer. Pressure may be used. The composite is immersed into water to coagulate the polyurethane, but longer periods of time are required to coagulate the polyurethane because of the higher density or thickness of the woven or non-woven substrate used. For this reason, a process using a long continuous substrate is not economically feasible and is difficult to use in a continuous industrial operation. Another disadvantage is that the rate of coagulation of the elastomer in both hot and cold water is too slow.

If no second coagulated layer is formed, the first elastomer layer will be sealed by the supporting base on one side, and on the other side, by the fibrous substrate. Since solvent-non-solvent exchange occurs only through the fibrous substrate and not through the supporting base, the side of elastomer layer adjacent the fibrous substrate will coagulate first. This will prevent solvent-non-solvent exchange across the elastomeric layer, so that the side of the elastomeric layer adjacent the supporting base will remain fluid. As a result, the fibrous substrate cannot be fixed to the supporting base. When the fibrous substrate becomes swollen or distorted, the high fluidity of the layer provides a material having a crepe-like appearance. The longer the material is exposed to water, the greater will be the crepe-like appearance of the material. Of course, the particular type of fibrous substrate used is also a factor. The stress of volume contraction caused by the coagulation of the elastomer will be concentrated in those areas where the elastomer remains fluid and does not have sufficient strength to keep its dimensional stability. Accordingly, irregular, large cavities will be formed in the elastomeric layer adjacent the side of the supporting base, and when the resulting sheet material is bent, these areas will appear as cavities.

Therefore, this process is not suitable for the preparation of a sheet material, which uses non-woven fabrics, woven fabrics, napped fabrics or reclaimed leather of high density and thickness, that is to be used for shoe uppers, or the like.

In accordance with the process of this invention, the surface of the first microporous layer, which becomes the surface of the product, is protected by the base until the second layer has been almost completely coagulated. During the process, the surface of the first layer will not be directly contacted with guide rollers during the coagulation process either before or after introduction into the coagulation bath. Furthermore, even when the second layer has not coagulated completely, the sheet material can be peeled from the supporting base. When the composite is peeled from the supporting base, the second layer will be protected by the first coagulated layer, so that the appearance and property of the sheet will not be damaged by contact with guide rollers, etc. This is one of the advantages of this invention. As a consequence, it is unnecessary to predetermine when the coagulation process is expected to be complete, which is a very difficult predetermination to make. Industrial production of the sheet is made easier because it is more easily worked.

The thickness of the coating solution of the first coagulated layer in this invention is preferably in the range of approximately 0.05 to 5 mm., more preferably 0.1 to 1 mm. The thickness of the first layer after coagulation is approximately as thick as the layer prior to coagulation. From an economical and practical viewpoint of the product, the thickness of the layer is not critical. The quantity of coating solution applied to form the second coagulated layer must be sufficient to fill the gaps between the irregular surface of fibrous substrate and the smooth surface of the first coagulated layer and also to form a continuous porous layer between the first coagulated layer and the fibrous substrate. Therefore, the thickness of the coating solution for the second coagulated layer is determined not only by the application requirements of the product, but also by the nature of the fibrous substrate used. Practically speaking, good results are attainable when the coating solution is applied in a thickness of approximately 0.05 to 5 mm., preferably 0.1 – 1 mm., as in the case of the first coagulated layer. The thickness of the second coagulated layer in comparison with the first coagulated layer is in the range of 0.1 to 10 times, preferably 0.5 to 5 times, as thick as the latter.

As stated earlier, it is a feature of this invention that there is no limit in the selection of the types of raw materials which may be used. Therefore, the type of polymer used can be chosen from any of the known polymers which are useful in making porous sheets by conventional wet processes. The polyurethane elastomers selected can be the same as those used in U.S. Pat. No. 3,000,757 and in the other patents mentioned above.

As an example, a polyurethane elastomer prepared by reacting an organic diisocyanate with a polyester-glycol or a polyether-glycol having terminal hydroxy groups in the presence of a polyfunctional chain extender having at least two active hydrogen atoms, may be used.

Aromatic, aliphatic and cycloaliphatic diisocyanates or mixtures thereof can be used in forming the prepolymer. Suitable diisocyanates, for example, include toluene-2, 6-diisocyanate; m-phenylene diisocyanate; biphenylene 4,4'-diisocyanate; methylene bis(4-phenylisocyanate); 4-chloro-1,3-phenylene diisocyanate; naphthalene-1,5-diisocyanate; tetramethylene-1,4-diisocyanate; hexamethylene-1,6-diisocyanate; decamethylene-1,10-diisocyanate; cyclohexylene-1,4-diisocyanate; methylene bis(4-cyclohexyl isocyanate) and tetrahydronaphthalene diisocyanate.

Suitable polyalkylene ether glycols are, for example, polyethylene ether glycol, polypropylene ether glycol, polytetramethylene ether glycol, polynonamethylene ether glycol, polydecamethylene ether glycol, polydodecamethylene ether glycol and mixtures thereof.

The most useful polyglycols are those having a molecular weight of 300 to 5,000, preferably 400 to 2,000.

Polyesters which can be used instead of, or in conjunction with the polyalkylene ether glycols, are, for example, those formed by reacting acids, esters or acid halides with glycols. Suitable glycols are the polymethylene glycols, such as ethylene-, propylene-, tetramethylene-, decamethylene glycol, substituted polymethylene glycols, such as 2,2-dimethyl-1,3-propandiol, cyclic glycols such as cyclohexanediol and aromatic glycols such as xylene glycol. Aliphatic glycols are generally preferred when maximum product flexibility is desired. These glycols are reacted with aliphatic, cycloaliphatic or aromatic dicarboxylic acids or lower alkyl-esters to produce relatively low molecular weight polymers having molecular weights similar to those indicated for the polyalkylene ether glycols. Acids for preparing these polyesters are, for example, succinic, adipic, suberic, sebacic, terephthalic, and hexahydroterephthalic acids and the alkyl and halogen substituted derivatives of these acids.

The known poly-functional chain extenders include diols such as ethylene glycol, propylene glycol, and butylene glycol, and amines such as hydrazine and hexamethylenediamine. It is especially preferable, from the viewpoint of bend resistance, softness, and durability of the resulting sheet, to use a compound prepared by reacting a polyester glycol with an organic diisocyanate.

Other polymers which can be used together with the polyurethane elastomers include polyvinylchloride, copolymers of vinylchloride and vinylacetate, polyamides, polyamino acids, cellulose derivatives, polymers or copolymers of alkyl acrylates or methacrylates, chlorosulfonated polyethylene and synthetic latex such as copolymers of butadiene and acrylonitrile. The mixing ratio of these polymers to the polyurethane elastomer can be freely varied depending upon the purpose of product. The amounts of the other polymers mixed with the polyurethane elastomers must be confined to certain limits so that the texture or "feel" and properties of the resulting product are acceptable. The amounts of the other polymers used are confined to amounts of less than 50% by weight of the polyurethane elastomer used.

It is not necessary to use the same polymer solution for forming the first and seconds coagulated layers. The polymers and their mixture ratios can be freely selected. For instance, for the first coagulated layer, a polymer solution comprising a dimethylformamide solution of a polyurethane elastomer, which is chain-extended with hydrazine, may be used, and for the second coagulated layer, a polymer solution comprising a polyurethane elastomer obtained by reacting the entire mixture of a polyglycol, a diisocyanate and a diol as a chain extender in dimethylformamide, is used. In a case such as this, the first coagulated layer is resistant to the solvent used in the polymer solution of the second coagulated layer when it is applied thereon. Also, since the polyurethane elastomer used in the second layer has a relatively wide polymerization distribution, it prevents excessively quick coagulation of the second layer when it is subjected to an excessive amount of non-solvent from the first coagulation layer. Thus, manufacturing conditions are much easier to control.

However, generally speaking, it is not necessary to use different formulations for the first coagulated layer and for the second one merely to take advantage of the above-mentioned effects. The primary factors affecting the selection of the formulations are those concerned with achieving the proper degree of flexibility, cold-weather resistance, heat resistance or other similar properties in the products.

As for the solvent, dimethylformamide is commonly used in the polyurethane elastomer solutions. However, any polymer solvent which is miscible with a non-solvent, such as water, can be used. Others are: dimethylsulfoxide, N,N-dimethylacetamide, N-methyl-2-pyrrolidone, dioxane, acetone, tetrahydrofuran, ethyl acetate and mixtures thereof.

The concentration of polymer in the polymer solution is selected to suit the desired softness or surface hardness of the end product and to suit the kind of polymer used. A selection is made, however, to adjust viscosity of the coating solution to a range such as approximately 3,000 to 120,000 cps., which allows easy application of the coating onto the supporting base or the first coagulated layer. Such a concentration is about 10 to 40 weight percent of said solution or, preferably 15 to 30 weight percent.

The non-solvent can be any liquid which is miscible with the solvent and water, such as water, ethylene glycol, glycol ether and alcohols. In the process of this invention, water achieves all of the objectives required.

The supporting base can be any material which is not deformed by the volume contraction of the coagulation process of the polymer covering and which is capable of maintaining the dimensions of the sheet until the second layer bound to the fibrous substrate has coagulated. It must also be capable of being peeled from the coagulated layer. Thus, it is important that the supporting base should not be damaged by the solvents and non-solvents used. The typical bases include plastic sheets made of polypropylene, polyamides, polyesters or polytetrafluoroethylene, and thin steel sheets, glass plates, plastic coated fabrics and metal plated plastics, etc.

Paper having no water resistance, thin plastic films of about 0.01 mm. thick, thin metal foils, or films having porous surface, are not suitable for use because they do not have enough rigidity to maintain their dimensions or they may cause trouble when peeled off of the coagulated layer.

A sheet which is flexible in its longitudinal direction and is rigid in its cross direction, such as a plastic sheet 0.2 mm. thick and a thin stainless steel sheet, is especially useful for the purpose of this invention and in industrial production.

The scope of this invention is not limited by the formula of the coagulation bath, which coagulates the polymer by diluting the solvent of the polyurethane elastomer with the non-solvent. In the description of the process of this invention, the term "water" has often been used for the term "non-solvent".

The fundamental features of this invention are not affected by using 100% water as the non-solvent or by using an aqueous solution of solvent or other non-solvent as the non-solvent.

Coagulation of the second layer is attained without immersing the composite in the bath. For example, the second coagulated layer can be formed by putting the fibrous substrate on the second layer, and then spraying water on the fibrous substrate.

The process for forming the two layers in this invention is described as first forming a coagulated layer, applying a second layer, and then superimposing a fibrous substrate on the latter layer which is then coagulated.

However, the formation of the second layer is not limited to applying the polymer on the first coagulated layer. It is possible to apply the second layer on the fibrous substrate first and then to superimpose said second layer-fibrous substrate laminate on the first coagulated layer. It is also possible to apply a polymer solution for the second layer between the first coagulated layer and the fibrous substrate while simultaneously laminating the first layer with the substrate.

The conditions for the formation of the second layer can be changed so as to yield products having different design characteristics. For instance, by applying a polymer solution having a decreased viscosity as the second layer on the fibrous substrate, the amount of the polymer coagulated in the structure of the fibrous substrate can be increased.

Also, even when the second layer is applied to the first coagulated layer, the amount of polymer coagulated in the structure of the fibrous substrate and the thickness of the remaining polymer between the first coagulated layer and the fibrous substrate can be controlled by varying the time in a period from several seconds to several minutes from the moment of application of the fibrous substrate to the coagulation of the second layer.

When applying the polymer solution for the second layer, it is possible to control the microporous structure of the second coagulated layer by adjusting the amount of liquid retained in the first coagulated layer. This is accomplished by squeezing the first layer just after the initial coagulation processes occur with a proper means such as a metal roller, a rubber roller, or a sponge roller under controlled pressure.

Whether or not the first coagulated layer has been squeezed, it is still possible to remove water from the surface of the first coagulated layer by blowing hot or cold air across its surface. However, it is preferable to retain water or another non-solvent in the first coagulated layer in amounts of 50%, or preferably more than 100% of the dry weight of the first coagulated layer, at the time of applying the second layer.

The polymer solutions used in forming the first and second layers of this invention are simply prepared by dissolving a polymer in a solvent. Other polymer solutions which have been conventionally used for coagulating solutions to form microporous structures, are colloidal dispersions of polymers prepared by adding non-solvents to solutions of the polymers, or gels of polymers, prepared by adding non-solvents to polymer solutions and separating the gel.

Having generally described the invention, a further understanding can be obtained by reference to the following specific examples which are provided herein for purposes of illustration only and are not intended to be limiting in any manner. In these examples, all percentages are intended to be referred to as percentages by weight, unless otherwise stated.

EXAMPLE 1

A polyester having an average molecular weight of about 2,000 with hydroxy groups at the both terminals was prepared from ethylene glycol and adipic acid. The product was reacted with diphenylmethane-4,4'-diisocyanate to form the prepolymer, which was chain-extended with butyleneglycol to form the polyester urethane elastomer (I). The resulting polyester urethane elastomer was diluted with dimethylformamide to form a 25% solution (viscosity is 13,000 cps. at 25°C.).

A polyester sheet of 0.3 mm. thicknness was used as a supporting base, and said polyurethane solution was applied onto the supporting base at a thickness of 0.4 mm. The laminate was immersed in water at 40°C. for 10 minutes to form the first coagulated layer. The coagulated layer with its supporting base was washed with hot water at 50°C. and squeezed by passing it through rubber rollers to lower the water content to 280% on a dry weight basis of the first coagulated layer.

The same polyurethane elastomer solution mentioned above was applied at a rate of 300 g/m² on the first coagulated layer prepared above, to form a second layer. A fibrous substrate felt having a density of 200 g/m² was prepared by needle-punching a web consiting of 40% polyester fibre (3 denier/51 mm.) and 60% 6-polyamide fibre (3 denier/51 mm.). The felt was impregnated with a styrene-butadiene rubber (SBR) type adhesive, so that the ratio of fibre to adhesive was 48 : 52, dried, and vulcanized. Both surfaces of the felt were buffed to obtain a non-woven fabric having a bulk density of 0.39 g/cm³ and a thickness of 0.85 mm. The non-woven fabric was superimposed on the second polymer layer of the laminate and the resulting laminate was subjected to a slight pressure by passing it through a pair of rollers whose slit was adjusted. The resulting composite was immersed in hot water at 40°C. for 20 minutes to coagulate the second layer.

After being peeled from the supporting base, the resulting product was repeatedly washed with hot water, squeezed to remove substantial amounts of dimethylformamide, dried with hot air and then cylinder-dried. The product was a smooth, leather-like sheet of material, upon whose surface no roughness or small cavities appeared even when the sheet was folded or stretched beyond its original dimensions. The product was finished by gravure printing and embossing. The product is useful for the same applications as smooth, natural leather including uses for shoe uppers, upholstery and hand bags. The water vapor permeability of the finished sheet was 8,800 g/100m²/h.

Reference

In comparison to the aforementioned process, a solution of a polyurethane elastomer was applied on a supporting base and a non-woven fabric was superimposed on it. The resultant laminate was slightly pressed, immersed in water to coagulate the polymer, and the product was peeled off of the base.

The dimethylformamide solution containing 25% polyurethane elastomer as prepared in Example 1 (viscosity is 13,000 cps. at 25°C.) was applied to provide a coating 0.6 mm. thick on a glass plate. The non-woven fabric of Example 1 was superimposed over the polymer layer under slight pressure, and the resultant laminate was immersed in water at 40°C. After immersing the laminate in a water bath for two hours, coagulation of the polyurethane elastomer layer was not complete. Consequently, the laminate was treated in hot water at 50°C. for 3 hours, and the product peeled off. A crepe-like appearance became evident on the surface of the non-woven fabric during the immersion process, and the crepe-like appearance remained on the peeled product. Many small cavities were scattered on the surface of the coagulated layer. These defects could not be eliminated by finishing processes such as printing or embossing.

EXAMPLE 2

A polyethylene-propylene adipate copolymer having an average molecular weight of 2,100 and having hydroxy groups at both terminals, was reacted with diphenylmethane-4,4'-diisocyanate. The product was chain-extended with ethylene glycol to form a polyester type urethane elastomer (II).

A fibrous substrate mat having a density of 240 g/$^2$ was prepared by needle-punching a web consisting of 30% rayon fiber (3 denier/51 mm.), 20% cotton and 50% polyamide (3 denier/44 mm). The mat was impregnated with a dimethylformamide solution containing 12% of the polyurethane elastomer (II), so that the ratio of fiber to the solid polyurethane elastomer was 65 : 35, coagulated, desolvented and dried.

Both surfaces of the mat were buffed to obtain a non-woven fabric having a bulk density of 350 g/m$^2$ and a thickness of 0.85 mm. The dimethylformamide solution containing 25% of the polyester urethane elastomer (I) of Example 1 was admixed with 5% channel carbon, 5% cellulose acetate butylate, and 5% acrylonitrile-butadiene-styrene copolymer based on the elastomer to form a paste. The paste was applied on a polyester sheet to a thickness of 0.5 mm. and the resulting layer was coagulated in accordance with the process of Example 1. The laminate was squeezed by passing it through a pair of rubber rollers to retain about 300% of the water compared to the dry weight of the coagulated layer.

A dimethylformamide solution of the polyurethane elastomer (II) was applied on the first coagulated layer in amounts of 400 g/m$^2$, and the non-woven fabric was superimposed on the solution layer under a slight pressure. The resulting laminate was immersed in water at 40°C. After the supporting base was peeled off, the product was washed with water and dried in accordance with the process of Example 1.

The resulting sheet had a smooth surface, a soft leather-like appearance and a water vapor permeability of 8,200 g/100m$^2$/h. The surface polymer layer of the product had a microporous structure. The inner polymer layer coagulated within the structure of the non-woven fabric, and adapted itself to the delicate variations in the density of the non-woven fabric. A suitable leather-like sheet of material was obtained by treating the resulting sheet by gravure printing, or by spraying and embossing.

EXAMPLE 3

A polyester having hydroxyl groups at both terminals, which was prepared by reacting 1,4-butandiol and adipic acid, was reacted with diphenylmethane-4,4'-diisocyanate and was chain-extended with ethylene glycol to form a polyester polyurethane elastomer (III).

A dimethylformamide solution containing 15% of the polyurethane elastomer was admixed with 3.5% channel carbon which was treated with metal soap, 0.2% copper phthalocyamine green and 2% silica powder based on the elastomer to form a paste. The paste composition was applied on a polypropylene sheet to give a layer 0.6 mm. thick. The resulting laminate was immersed in water at 20°C. for 15 minutes to coagulate the polyurethane. The water on the surface of the coagulated layer was removed by passing the laminate through a sponge roller and by blowing cold air across the surface to lower the water content in the polymer to 220–250% of the dry weight of the polymer. A slightly napped knitted fabric was wetted with methanol on the laminating side by a gravure roller. A polymer solution was prepared by diluting the polyurethane elastomer (II) of Example 2 with dimethylformamide to a viscosity of 3,000 cps. A second layer of this polymer solution was applied in amounts of about 300 g/m$^2$ between the first coagulated layer and the wet knitted fabric while simultaneously superimposing the first coagulated layer and the knitted fabric. The unified composite was immersed in water at 50°C. for 20 minutes to coagulate the second layer. The resulting product was peeled from the polypropylene sheet, repeatedly washed with hot water squeezed to remove the remaining solvent and dried.

When the surface of the polyurethane elastomer was sanded to a depth of 0.08 – 0.10 mm. a suede-like sheet which is suitable for clothing material was obtained. The water vapor permeability of the sheet was 21,000 g/100 m$^2$/h.

Having now fully described the invention, it will be readily apparent to one of ordinary skill in the art that many changes and modifications can be made thereto without departing from the spirit or scope of the invention as set forth herein.

Accordingly, what is claimed and intended to be covered by Letters Patent is:

1. A process for preparing a leather-like sheet of material which comprises:

a. applying a polyurethane polymer to a supporting base;

b. coagulating said polymer solution to form a porous structure which constitutes a first coagulated polymer layer (I) by immersing the supporting base and layer in a non-solvent for said polymer such that at least a portion of said non-solvent is retained in the pores of said layer;

c. applying a second layer of a polyurethane polymer solution onto said first coagulated layer (I), whereby the non-solvent which is retained in the pores of said first layer acts to coagulate the second layer at the interface between said layers;

d. applying a fibrous substrate to said second layer to form a composite;
e. coagulating said second layer by immersing the composite in a non-solvent for the polymer to form a second coagulated polymer layer (II);
f. peeling the resulting composite which consists of said first coagulated layer (I), said second coagulated layer (II), and said fibrous substrate, from its supporting base to yield the product; and
g. removing the solvent from the resulting product by washing with water and drying.

2. The process of claim 1, wherein steps (c) and (d) are performed by applying a second layer of a polymer solution onto a fibrous substrate to form a laminate, superimposing the resulting laminate on the first coagulated layer which retains a quantity of non-solvent, to form a composite.

3. The process of claim 1, wherein step (e) is performed by coagulating the second layer by spraying a non-solvent onto the open side of the fibrous sheet material.

4. The process of claim 1 wherein the polymer is substantially a polyurethane elastomer and the non-solvent is water or an aqueous solution and wherein coagulation is caused by replacement of the polymer solution with a non-solvent which is miscible with the solvent and water.

5. The process of claim 1, wherein the polymer solution is a composition comprising a polyurethane elastomer, a solvent for the polymer, and coloring material and other additives.

6. The process of claim 1, wherein the supporting base is an endless belt of a substance which is not damageable by water or said solvent.

7. the process of claim 1, wherein the first polymer solution is applied to a thickness of 0.05 – 5 mm and the second layer of polymer solution is applied so as to be from 0.1 – 10 times the thickness of the first layer.

8. The process of claim 1, wherein the polymer solution has a viscosity of from 3,000 to 120,000 cps.

9. The process of claim 1, wherein the non-solvent is water, ethylene glycol, glycol ether, or an alcohol.

10. The process of claim 1, wherein the portion of non-solvent retained in said first coagulated layer (I) is more than 50% of the dry weight of the first coagulated layer.

* * * * *